July 5, 1927.
O. H. BANKER
BAND SAW SHARPENER
Filed March 3, 1924
1,634,281
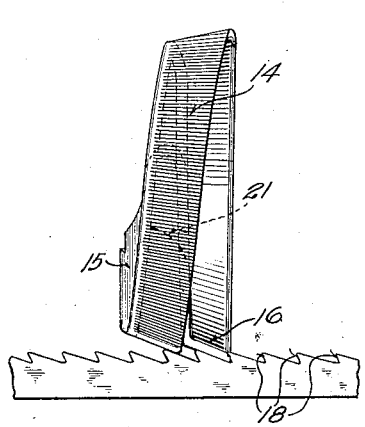
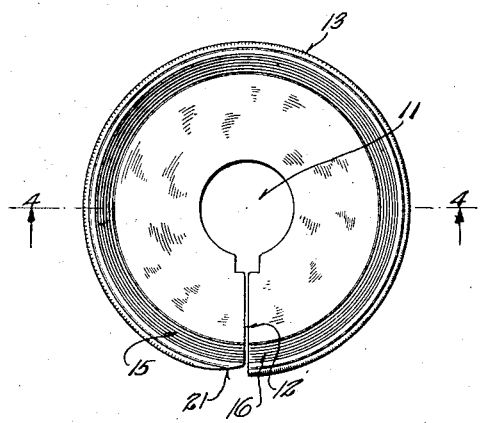
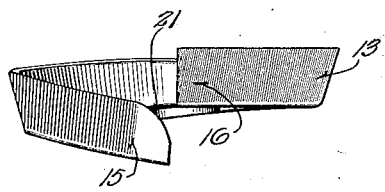
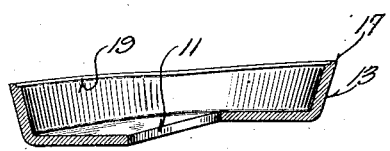
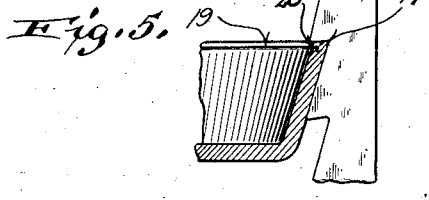
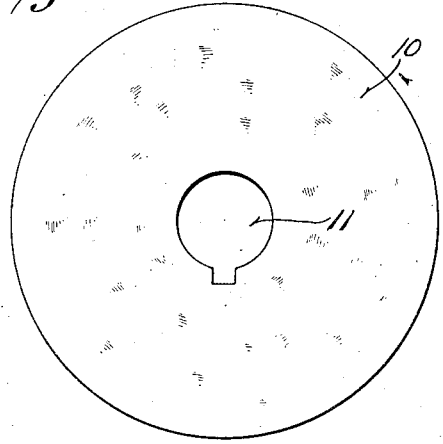
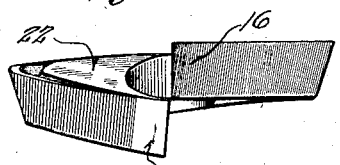
INVENTOR.
Oscar H. Banker.
BY
Morsell, Keeney & Morsell.
ATTORNEYS.

Patented July 5, 1927.

1,634,281

UNITED STATES PATENT OFFICE.

OSCAR H. BANKER, OF CHICAGO, ILLINOIS.

BAND-SAW SHARPENER.

Application filed March 3, 1924. Serial No. 696,544.

This invention relates to band saw sharpeners, and particularly to the file or cutter employed for sharpening the saws. The invention is adapted particularly for use in connection with a machine for holding and advancing the saw, while the same is being filed or cut by the cutter which has a rotary movement.

The invention has for its particular object to provide a rotary saw sharpener having characteristics making it peculiarly adaptable to the use to which it is to be put. The construction of the sharpener embodies means for advancing the saw tooth by tooth during the cutting operation, and offering the possibility of filing the teeth of saws whose pitches differ somewhat, without changing the sharpener.

The invention has furthermore as one of its objects to provide means for smoothing or burnishing a portion of the saw tooth during the cutting operation and for protecting the saw tooth points during the cutting operation.

Furthermore, the construction of the band saw sharpener herein described is one which lends itself particularly to convenient and economical manufacture, it being possible to form the sharpener from a blank of sheet metal, the sharpener being stamped first into a dished shaped member and then further shaped and machined to provide the bevelled and spirally arranged cutting surfaces.

The various objects of the invention, as well as the novel construction of the same, will be made more apparent as the description proceeds, especially when considered in connection with the accompanying drawing wherein:

Fig. 1 is a side elevational view of a band saw sharpener constructed in accordance with this invention;

Fig. 2 is a plan view of the sharpener;

Fig. 3 is another side elevation, viewed at right angles from Fig. 1, with the sharpener horizontally arranged;

Fig. 4 is a sectional view, taken substantially on the plane indicated by the line 4—4 in Fig. 2;

Fig. 5 is a fragmentary detail sectional view on an enlarged scale;

Fig. 6 is a view of the blank from which the form of sharpener illustrated in Figs. 1 to 5 may be constructed; and Fig. 7 is an elevational view of a modified form of the sharpener.

Referring now to the drawings, and particularly to Figs. 1 to 6, the first form of the invention will be described. It is proposed, in the preferred embodiment of the invention, to form the sharpener from a blank of sheet metal 10, which may be stamped to form a dished shaped body, the material being apertured centrally as at 11 for the reception of a shaft, upon which the sharpener is adapted to be mounted, the sharpener during its operation being rotated. The sharpener body is furthermore preferably split as at 12.

The sharpener is formed with a peripheral wall 13 upon which there are formed teeth 14, providing a cutting surface, these teeth graduating in size and depth around the cutting surface, with the coarse teeth at one end thereto and the finer teeth at the other end. By spliting the sharpener body as at 12, it may be shaped to present a spiral formation, one end of this spiral member being indicated by the reference character 15, while the other end thereof is indicated by the reference character 16.

It might be mentioned that the coarse teeth 14 are arranged at the end 15 of the spiral cutter, these teeth gradually becoming finer in the direction of the end 16. By reason of the spiral formation of the cutter, it is caused to advance the saw, tooth by tooth during the cutting operation.

The wall 13 of the cutter is preferably inclined, thus presenting a bevelled surface, inclined in the direction of the axis of rotation of the cutter. The edge 17 of the cutter body is also provided with a plurality of cutting teeth, adapted for instance, to cut the corners 18 of the saw teeth. These cutter teeth extend only a short distance inwardly along the edge of the cutter body, the remaining surface being smooth and hard, whereupon the portion of the saw tooth immediately adjacent the corner 18 will be smoothed or burnished. The inner corner of the edge of the cutter is cut away, thus providing an annular recess 19, adapted to receive the points 20 of the saw teeth during the cutting operation. In this manner these saw teeth points are protected from being dulled or crushed.

Arranged adjacent the end 15 of the cutter is a cam surface 21, whereby a cam starting point is provided for the cutter and the danger of the cutter striking the side of a tooth and bending the same is eliminated.

Furthermore, by reason of this cam arrangement it is possible to file teeth of different pitches without changing the file. In the event that the pitch of the file is greater than that of the saw tooth, but less than double the pitch of the saw tooth, the cam touching the point of the saw tooth will push the saw backwards as it revolves, the saw following the cutter until the tooth of the saw comes into full contact with the cutter, whereupon the cutting operation will occur and the saw fed forward and the operation repeated.

In shaping the cutter to produce this spiral formation, the portion thereof adjacent the end 10 is arranged as clearly shown in Figs. 1, 3 and 7 of the drawing, at right angularly to the axis of rotation of the cutter so that during the engagement with the saw of this portion of the cutter, the saw will remain stationary to enable it to be acted upon by machines for offsetting the teeth.

In Fig. 7 a cutter 22 is illustrated, differing somewhat from the form of the invention just described, in that it is not formed of sheet metal but is preferably of a solid formation. In all other respects the form of cutter illustrated in Fig. 7 is precisely similar to the one hereinbefore described, and for this reason similar reference characters indicate like parts.

From the foregoing it will be immediately apparent that the band saw sharpener constructed in accordance with this invention will render it possible to automatically feed the saw during the cutting operation and to efficiently cut the surfaces thereof, provision being made for introducing a period of inactivity in the saw, whereby the machine for offsetting the teeth of the saw may be brought into action.

The peculiar formation of the cutter enables the various pitches of saw teeth to be effectively cut but provision is furthermore made for protecting the saw teeth points and for burnishing or smoothing the surface of the teeth between the points and the inner corners thereof. Furthermore, in accordance with this invention it is possible to form a band saw sharpener from sheet metal, thus simplifying and minimizing the cost of manufacture.

It will be apparent to those skilled in this particular art that various modifications may be resorted to without departing from the spirit and scope of the invention, and to this end reservation is made to make such changes as may come within the purview of the accompanying claims.

Having thus described the invention, what is claimed is:

1. A band saw sharpener formed with a tapered periphery provided with cutting teeth of graduated depth and a cutting edge of spiral formation.

2. A saw sharpener formed with a tapered periphery provided with cutting teeth of gradually decreasing size, the larger of said teeth being arranged at the forward end of said sharpener.

3. A saw sharpener formed with a cutting edge spiral throughout a part of its length, and straight thruout the remainder of its length, and graduated cutting teeth formed on said edge, the larger of said teeth being arranged on the spiral portion thereof.

4. A saw sharpener formed with a tapered periphery and a burnishing surface, and a plurality of cutting teeth of gradually decreasing size, the larger of said teeth being arranged at the forward end of said sharpener.

5. A saw sharpener formed with a tapered periphery provided with cutting teeth of gradually decreasing size, said sharpener being of spiral formation and having a cam shaped starting point adjacent the larger size of teeth.

6. A disk shaped sheet metal saw sharpener stamped from a blank of material and shaped to form a spiral cutting edge provided with teeth of gradually decreasing size, the larger of said teeth being at the forward end of said sharpener.

In testimony whereof, I affix my signature.

OSCAR H. BANKER.